United States Patent [19]

Spears, Jr.

[11] 4,078,975
[45] Mar. 14, 1978

[54] SOLAR POTABLE WATER RECOVERY AND POWER GENERATION FROM SALINOUS WATER

[75] Inventor: John F. Spears, Jr., Mount Prospect, Ill.

[73] Assignee: UOP Inc., Des Plaines, Ill.

[21] Appl. No.: 764,256

[22] Filed: Jan. 31, 1977

[51] Int. Cl.² .......................... B01D 3/00; B01D 3/06
[52] U.S. Cl. ...................................... 203/10; 203/49;
   203/DIG. 1; 203/DIG. 20; 202/185 R;
   202/234; 126/271; 60/641; 60/648; 60/677
[58] Field of Search ................. 60/641, 648, 655, 677;
   126/270, 271; 202/234, 185 R; 203/10, 49, 100,
   DIG. 1, DIG. 20

[56] References Cited

U.S. PATENT DOCUMENTS

| | | | |
|---|---|---|---|
| 2,636,129 | 4/1953 | Agnew | 203/DIG. 1 |
| 2,803,591 | 8/1957 | Coanda | 202/234 |
| 2,902,414 | 9/1969 | Schmerzler | 203/10 |
| 2,969,637 | 1/1961 | Rowekamp | 202/234 |
| 3,076,096 | 1/1963 | Bachman | 203/DIG.1 |
| 3,257,291 | 6/1966 | Gerber | 203/10 |
| 3,317,406 | 5/1967 | Beard | 203/49 |
| 3,334,026 | 8/1907 | Dobell | 203/10 |
| 3,345,272 | 10/1967 | Collins | 203/49 |
| 3,356,591 | 12/1967 | Peterson | 203/20 |
| 3,416,318 | 12/1968 | Chocquet | 203/DIG. 20 |
| 3,428,529 | 2/1969 | Gumuci | 203/10 |
| 3,522,151 | 7/1970 | Dismore | 203/10 |
| 3,565,767 | 2/1971 | Light | 203/49 |
| 3,928,145 | 12/1975 | Othmer | 203/DIG. 20 |

FOREIGN PATENT DOCUMENTS

| | | | |
|---|---|---|---|
| 1,143,569 | 1957 | France | 202/234 |
| 2,503,251 | 7/1976 | Germany | 202/234 |
| 2,503,249 | 7/1976 | Germany | 202/234 |
| 628,314 | 8/1949 | United Kingdom | 202/234 |

*Primary Examiner*—Charles N. Hart
*Assistant Examiner*—Ernest G. Therkorn
*Attorney, Agent, or Firm*—James R. Hoatson, Jr.; Robert W. Erickson; William H. Page, II

[57] ABSTRACT

A process for recovering potable water from a source of salinous water — e.g. sea and/or ocean water. Certain modifications afford the simultaneous generation of power. A portion of salinous water and an air stream are introduced into a solar radiation heat sink, with the air stream flowing over the salinous water. Heated, water-containing air is withdrawn from the heat sink and reduced in temperature to recover potable water. The heated salinous water, from the heat sink, may be recycled thereto, or at least in part introduced into a flash separation zone, maintained at a subatmospheric pressure to provide a non-salinous vaporous phase which is passed through a turbine, from the resulting motion of which power is generated. The exiting turbine vapors are cooled and/or condensed via indirect contact with a second portion of salinous water to recover additional potable water. Alternatively, the heated, water-containing air stream may be cooled by vaporizing a hydrocarbon which then passes through a turbine for the purpose of producing energy. Salinous water which is returned to the original source thereof is at a temperature not more than 15° F. greater than the coldest salinous water obtained from the source.

10 Claims, 1 Drawing Figure

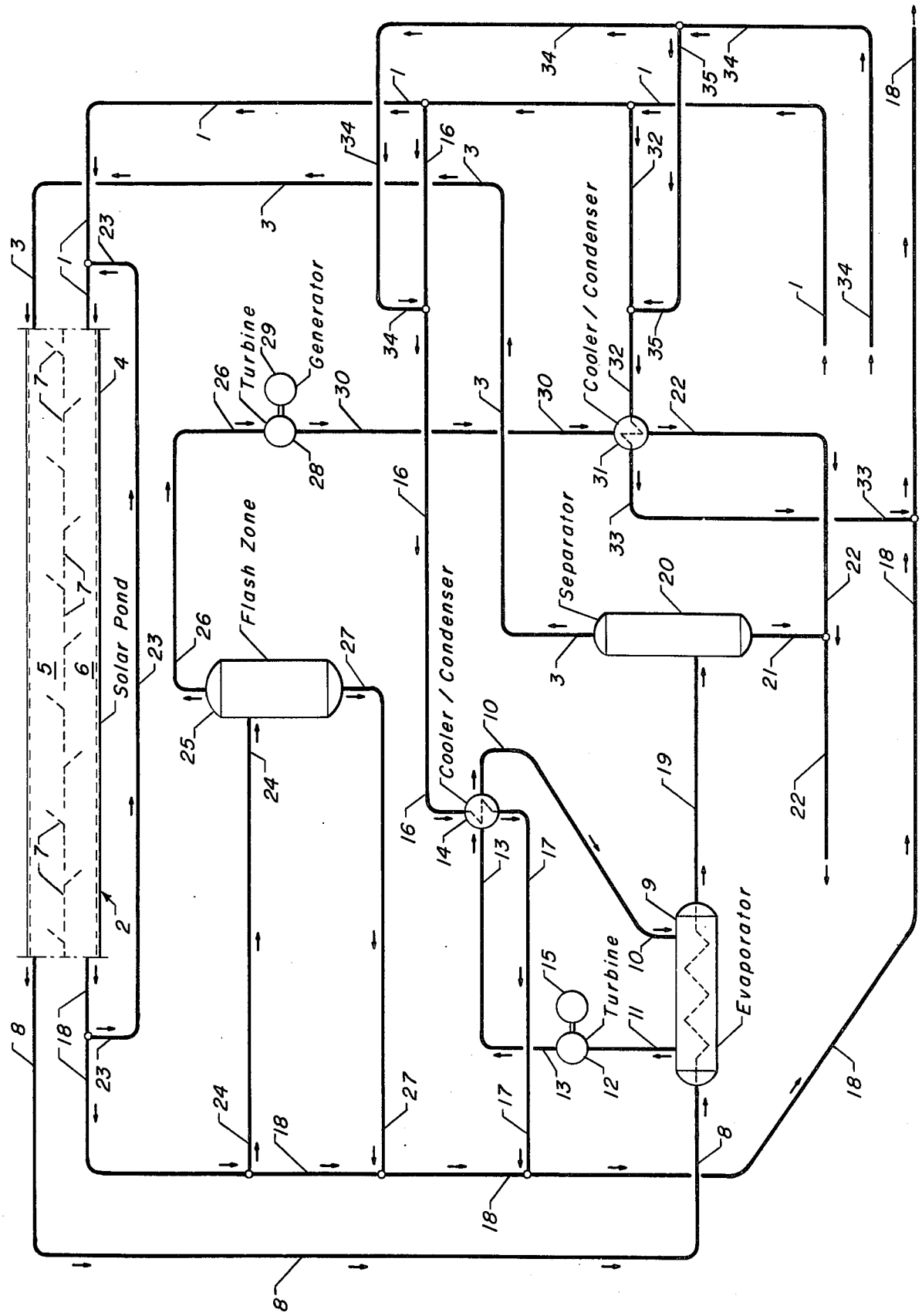

SOLAR POTABLE WATER RECOVERY AND POWER GENERATION FROM SALINOUS WATER

APPLICABILITY OF INVENTION

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is, or will soon be an established fact. One consequence, of course, is that a corresponding shortage of electrical power can be foreseen; that is, it will no longer be practical to convert one or more of these energy sources into electrical power. To alleviate this situation, serious consideration is currently being given to ocean thermal energy conversion; that is, utilizing the existing thermal gradients to generate power. The basic concept, first proposed by a French physicist as early as 1881, involves operating a heat engine using warm surface water as the heat source and cold water, from the ocean depths, as the heat sink.

In a similar vein, many areas of the world, especially those which are arid, face a critical shortage of potable water, both for human consumption and irrigation. Although located throughout the world, such areas abound particularly in the American Southwest, the Middle Eastern countries and in the Northern desert regions of Africa. Coincidentally, many of these countries, or localized areas thereof, either border upon, or are readily accessible to sea and/or ocean waters. Also coincidental is the fact that these areas have moderate to hot climates with high average air temperatures and receive a relatively high amount of solar radiation. The process encompassed by my inventive concept, although not limited to such areas, is primarily applicable thereto. Exemplary of these are Kuwait and Saudi Arabia, the Western coast of the latter bordering upon the Red Sea.

The invention herein described is principally directed toward a technique for recovering potable water from otherwise impotable water. Although applicable to the processing of many types of brackish water and/or water having a high degree of salinity, the inventive concept is primarily intended to be utilized in recovering potable water from river, sea and/or ocean water. As hereinafter set forth in greater detail, the basic technique is readily modified where electrical power is in short supply and somewhat great demand. The present invention makes use of the natural radiant solar energy supply and, where available, the natural temperature gradients existing in ocean and/or sea waters.

Briefly, the present invention involves the use of the virtually limitless supply of natural solar energy; as hereinafter more specifically set forth, combinative use is also made of ocean thermal gradients where existing and readily obtainable. Initially, a portion of salinous water is introduced into a solar radiation heat sink — e.g. a covered solar pond. An air stream is also introduced into the heat sink in such a manner as to flow over the salinous water. These flowing streams are maintained within the heat sink, being exposed to absorbed radiant solar energy therein, for a time sufficient to increase their temperatures, as well as the water content of the air stream. The heated, evaporated water-containing air stream is withdrawn from the heat sink, cooled and passed into suitable separation means from which potable water is recovered. At least a portion, but preferably all of the air stream is then recycled to the solar radiation heat sink. Also, the heated salinous water emanating from the heat sink is at least in part returned thereto.

Where energy demand and its available supply is a consideration, energy is recovered by employing the heated, water-containing air stream as the heat-exchange medium used to vaporize a light hydrocarbon stream. Vaporized hydrocarbons pass into and through a turbine, from the resulting motion of which energy is recovered. Exiting hydrocarbon vapors are cooled and/or condensed, via indirect contact with air or a second salinous water portion, and re-introduced into the vaporizer. The energy recovered from the resulting motion of the turbine may be employed to generate power; however, it is more advantageous and beneficial to the present process when used to drive compressors, pumps, etc.

Where generated power is desired, a portion of the heated salinous water from the solar radiation heat sink may be introduced into a flash separation zone, to provide a non-salinous vaporous phase and a salinous liquid phase. The former passes through a turbine, and additional power is generated from the resulting motion thereof. Exiting turbine vapors are cooled and/or condensed to recover additional potable water. The final salinous liquid phase, from the flash separation zone may be returned to the source, or recycled in part to the solar radiation heat sink, preferably the former.

From the foregoing brief description of the process encompassed by my inventive concept, it will be readily ascertained that a great degree of flexibility is afforded in varying the quantities of recovered potable water and generated power. In addition to the existing relative supply and demand of each in a given locale, other design considerations include capital investment and other economic aspects, and the availability of ocean thermal gradients. To reiterate, the present invention does not depend upon such ocean thermal gradients nor, for that matter, the proximity of oceans or seas. Potable water can be readily recovered from brackish and/or salinous water flowing in rivers and streams. Where, however, ocean thermal gradients of at least 5° F. (2.8° C.) to 15° F. (8.4° C.) are readily obtainable, additional benefits are afforded.

OBJECTS AND EMBODIMENTS

A principal object of the present invention involves the recovery of potable water from a source of brackish and/or salinous water. A corollary objective resides in the utilization of radiant solar energy in the recovery of potable water, accompanied by the generation of power.

A specific object of my invention resides in the utilization of a combination of solar energy with the natural temperature gradients existing at varying depths of the oceans and seas.

Another object is to provide a technique which affords economic enhancement over the use of natural gas or fossil fuels for the generation of electrical power and the production of potable water. Still another object is directed toward increasing the effective degree to which the radiant solar energy absorbed in a solar radiation heat sink is utilized in conjunction with the available ocean thermal gradient.

These objects, as well as others, are accomplished through the utilization of one embodiment which involves a process for recovering potable water from a source of salinous water, which process comprises the sequential steps of: (a) introducing a portion of salinous water into a solar radiation heat sink; (b) introducing an air stream into said solar radiation heat sink and flowing said air stream over said salinous water; (c) exposing said salinous water and said air stream, within said solar radiation heat sink, to absorbed radiant solar energy for a time sufficient to increase (i) the temperature of said salinous water and, (ii) the temperature and water content of said flowing air stream; (d) withdrawing the thus-heated (i) water-containing air stream and, (ii) salinous water from said solar radiation heat sink; (e) reducing the temperature of said water-containing air stream and recovering potable, non-salinous water therefrom; and, (f) recycling the resulting cooled air stream to said solar radiation heat sink.

In another embodiment, the air stream is introduced into the heat sink at a temperature above about 120° F. (49° C.) while the heated, water-containing air stream and the salinous water are withdrawn from the heat sink at temperatures in the range of about 130° F. (54° C.) to about 210° F. (99° C.).

In a specific embodiment, the heated, water-containing air stream indirectly contacts and vaporizes a hydrocarbon, and the resulting vaporized hydrocarbon is passed through a turbine, from the resulting motion of which energy is recovered.

These, as well as other objects and embodiments, will become evident to those possessing the requisite skill in the appropriate art, from the following detailed description of the present invention. First, however, a discussion of known applicable prior art is believed to be warranted.

PRIOR ART

It would appear that the greater proportion of available prior art consists of articles published in various trade and scientific journals. Three examples of these will be discussed hereinbelow. With respect to issued patents, these appear to be principally directed toward various devices capable of utilizing radiant solar energy for (1) heating homes and other types of structures, and, (2) the desalination of non-potable water. For example, respecting the latter, U.S. Pat. No. 2,803,591 (Cl. 202–234), issued Aug. 20, 1957 directs itself to a form of solar still for the purification of undrinkable water. This impure water is introduced, via spraying, into a closed and well-insulated chamber containing hot, dry air which becomes enriched with water vapor. The saturated hot air is withdrawn and cooled, yielding a condensate which is recovered as potable water. The device utilizes a series of mirrors to concentrate the rays of the sun for the purpose of heating the air which is introduced into the spray chamber.

In U.S. Pat. No. 2,813,063 (Cl. 202–234), issued Nov. 12, 1957, there is described a solar still having a wick which becomes saturated with salt water. Solar radiation heats the wick and causes the evaporation of water. The still is constructed from a semi-rigid, flexible material such as polyethylene, and is transparent with respect to solar radiation. A similar solar still, absent the wick, is illustrated in U.S. Pat. No. 2,848,389 (Cl. 202–234), issued Aug. 19, 1958.

An article entitled "Efforts to Tap Ocean Thermal Energy Gain", *Chemical and Engineering News*, Feb. 9, 1976, pp. 19–20, in part discusses the use of available ocean thermal gradients. In one particular system, a working fluid such as propane or ammonia is employed in a closed Rankine cycle. Warm surface water passes through a heat exchanger-evaporator, causing vaporization of the working fluid. The vapor is then expanded in a turbine to generate electric power. From the turbine, the vapor passes to a heat exchanger-condenser, wherein it is cooled and condensed by cold deep ocean water, and recycled to the heat exchanger-evaporator. Since the maximum differential temperature between surface water and deep water is not appreciably greater than 40° F., this technique suffers from an extremely low thermodynamic cycle efficiency, and, therefore, appears to be impractical on a commercial scale.

Of further interest is an article entitled "Desalination of Sea Water Using Solar Radiation Under Retarded Evaporation Conditions", *Industrial Engineering Chemistry, Process Design Development*, Volume 14, No. 4, 1975, pp. 351–358. Described is a desalination process which uses the temperature difference between the surface sea water and the deep sea water. A shallow pond, swamp area, or a large heating flat is proposed for use as the radiant solar energy sink. Water, from the surface, is pumped into the pond where it is heated by solar radiation. An insoluble monolayer, or a thin, transparent plastic sheet on the water surface is suggested for suppressing the evaporative heat loss from the water layer. The heated water is fed into a heat exchanger which is a vacuum chamber. The warm sea water partly flash evaporates while it runs down a packed section. The vapor condenses in an adjoining section over cooling coils being supplied with cold deep sea water, which cooling water is returned to the sea.

U.S. Pat. No. 3,928,145 (Cl. 203–11), issued Dec. 23, 1975, is specifically referred to in an article entitled "Power, Fresh Water and Food from the Sea", *Mechanical Engineering*, September, 1976, pp. 27–34. All of the subject matter which appears in the article can be found in the issued patent, the latter being more inclusive. Therefore, the discussion which follows will be specifically directed toward the pertinency of the issued patent, from which the present invention can be readily distinguished. As initially described, in general terms, combined use is made of solar radiation and the thermal gradients existing between surface and deep sea water. Warm surface water, from tropic seas, is increased in temperature through the use of a solar heater; the heated sea water is flash evaporated, or boiled at subatmospheric pressure. Sensible heat of the water leaves as vaporous heat, and the steam formed, as the sea water cools, expands to a lower pressure in a turbine or steam engine which drives a generator. The exit vapors are passed into a condenser wherein they are condensed via indirect heat-exchange with cold water from the depths of the sea. As an integral part of the process, the heated sea water from the condenser is introduced into a mariculture system which produces at least one specie of food fish; water from the mariculture operation is passed into the solar heater and therefrom into the flash boiler, the discharge water from which is returned to the sea.

As stated in this reference, surface sea water is available at 86° F. (30° C.), and may be increased in temperature to about 95° F. (35° C.) by admixing therewith the warm water effluent from the mariculture pools, or to about 175° F. (78.8° C.) by flowing ponds having black bottoms and transparent covers. When utilizing a single flash evaporation zone to generate power and recover potable water, the sea water becomes cooled to a temperature of 77° F. (25° C.); at this temperature, the subatmospheric pressure within the flash evaporator is 0.46 psia. (23.8 mm. of Hg.). The resulting vaporous phase is passed through a turbine, and the exit vapors condensed to 59° F. (15° C.) using cold sea water which is available at a temperature of 41° F. (5° C.), the latter (following condensation) increases in temperature to 50° F. (10° C.). The resulting flashed liquid phase, at 77° F. (25° C.), is returned directly to the source of the sea water. In so doing, the disclosed process effectively wastes the available 18° F. temperature differential between 59° F. and 77° F. by not contemplating a second flash evaporation of the 77° F. salinous liquid phase down to 59° F. This second flashing step would be effected at a subatmospheric pressure of about 0.25 psia. (12.9 mm. of Hg.), and would recover additional amounts of potable water. By not performing this second flashing step, about 18 BTU/lb. of water is unnecessarily rejected to the ocean.

Briefly referring to the accompanying drawing, the sole FIGURE presented is illustrative of several embodiments of the present invention. Upon comparison with the foregoing, it becomes clear that there is no prior art recognition, either singularly, or collectively of the potable water recovery process which is encompassed by my invention. It should be borne in mind that the present process is particularly intended for, and affords numerous advantages in the recovery of potable water from brackish or salinous water, although it may be somewhat modified to generate power where either necessary, or desirable. Regardless, the prior art is believed neither to anticipate, nor render obvious the invention herein set forth. Compared to U.S. Pat. No. 2,803,591, there is no awareness of flowing air over hot salinous water. As an example of the differences from this reference, the feed air (in the art-disclosed process) is hot and dry when introduced into the spray chamber, and neither the air, nor the sprayed salinous water increases in temperature therein. Solar energy is employed only to raise the temperature of dry air, and not to effect evaporation from heated salinous water into heated air. As hereinafter stated, the feed air to the present process is not dry in the context of the prior art, nor is it considered to be cool. To the contrary, it preferably is saturated and at a temperature above about 120° F. (49° C.).

Other prior art processes require flashing of heated salinous water to generate potable water — the present process does not. When, however, the present process is modified to generate some power, by flashing, this is accomplished at a temperature which permits the remaining salinous liquid phase to be returned to the source at a temperature not more than about 15° F. (8.4° C.) higher than the coldest salinous water obtained from the source, thus utilizing virtually all the readily available energy. Such is not the case with the prior art processes which are encumbered with the egregious technique of returning salinous water to the source thereof at a temperature such that energy is in fact wasted.

Other basic distinguishing features of the present invention are that evaporation from the surface of the water is encouraged and that air is circulated over the water to effect this evaporation. Furthermore, the process involves passing saturated air, preferably above about 120° F. (49° C.), into the solar pond rather than hot, dry fresh air. The latter necessitates utilizing energy to initially saturate the dry air which, in effect, uses heat sink surface area. Surface area is more advantageously utilized in evaporating water which is recoverable as potable water product. In comparison, the prior art actually makes every attempt to limit evaporation from the salinous water since this effectively cools the salinous water ultimately used to recover the collected energy. Water evaporation, in accordance with the present invention, also cools the heat sink or solar pond. However, this is not disadvantageous since a solar pond, say at 150° F. (65° C.), is a more efficient solar energy collector than one which functions at about 170° F. (76° C.).

SUMMARY OF INVENTION

The present invention offers a feasible process which is capable of currently being commercially acceptable. With respect to the demand imposed upon an installation of given capacity, there is afforded great flexibility with respect to the relative amount of generated power and the quantity of potable water recovered. That is, a commercially designed system, having a solar radiation heat sink, for example in the form of a shallow solar pond, can be so constructed that (1) the quantity of potable water recovered may be varied according to the current needs and, (2) the amount of generated power (if any) may be adjusted according to the seasonal demand. While the precise design of any given system is most certainly affected by existing economic considerations in the locale where the system is installed, being primarily the comparative values placed upon power and potable water, other factors must obviously be considered. Also fundamental to the process herein described is the cost of the solar radiation heat sink, which singularly has a great impact upon the necessary capital expenditure.

Whether designed solely for the production of potable water, or for the simultaneous generation of power, two of the most important variables constitute the temperature to which the flowing air stream and the salinous water are increased within the solar radiation heat sink. It follows that these variables are primarily dependent upon several principal factors: (1) the dimensions and efficiency of the solar radiation heat sink; (2) the available insolation, which may be conveniently expressed as the quantity of B.T.U.'s, from the sun, falling upon a square foot of heat sink surface per day, or the incidence of solar energy; (3) the temperature at which the air stream is introduced, or recycled to the solar radiation heat sink; and, (4) the effective residence time of the salinous water within the heat sink.

Another important economic aspect is the existence of a sufficient ocean thermal gradient obtainable between the surface of the water source and a reasonable depth below the surface. As previously stated, the present process is not dependent upon such a thermal gradient — i.e. at least a temperature differential of 5° F. (2.8° C.), to about 15° F. (8.4° C.), with the latter being a preferred minimum — and can function acceptably in the absence of ocean thermal gradients. Therefore, the present process is applicable to the purification of salinous or brackish river water in locations where an ocean thermal gradient is non-existent. Where, however, a temperature differential from about 15° F. (8.4° C.) to about 40° F. (22.4° C.) is available, the present technique affords enhancement in overall efficiency, especially at the higher temperature gradients.

Initially, salinous water is introduced into a solar radiation heat sink; an air stream is also introduced thereto in such a manner as to flow over the salinous water. Independent of whether an ocean thermal gradient exists and is readily accessible, or the temperature differential is virtually non-existent (as is the situation with flowing rivers and streams) the water introduced will be at a temperature proximate to the surface of its source. In the former situation, the surface water is at the higher temperature, while in the latter case, the salinous water effectively exists at a single temperature.

The comparative effective residence times of the air stream are not necessarily identical; while it is preferred to have a constantly-flowing air stream into, through and out of the heat sink, the flow of salinous water may be continual, varied, or intermittent. The particular heat sink utilized may take a wide variety of forms and/or designs; in the discussion which follows, the heat sink will be presumed a solar pond as contrasted, for instance, to a flat plate collector, both of which, or a combination thereof may be utilized within the process. A covered solar pond, in the interests of initial capital investment, constitutes an economical device for absorbing a portion of the insolation falling upon it from the sun. Salinous water is pumped into the solar pond to a depth which varies seasonally, much the same as the insolation from the sun varies seasonally. Depending upon the season, as well as the desired temperature of the heated water, a pond depth in the range of about one to about ten inches is acceptable, although a solar pond depth from two to about eight inches appears to be the most practical. The length and width of the solar pond are generally determined by the terrain and climate which are peculiar to the locale of the unit. The temperature to which the water in the solar pond will be heated, and that of the air stream flowing therethrough, depends upon the relative quantities of potable water and generated power which are withdrawn from the selected installation. For example, a solar pond receiving insolation in the amount of 3,000 BTU/sq.ft./day, and functioning at an efficiency of about 60.0%, would heat a three-inch level of water from about 85° F. up to about 200° F. during a period of approximately ten daylight hours. Solar pond efficiency is determined by comparing its absorptivity with the total insolation available. In accordance with the present invention, the solar pond should be dimensioned and designed, and have an efficiency such that the flowing air stream and the salinous water both attain a temperature in the range of about 130° F. (54° C.) to about 210° F. (99° C.), and preferably above about 150° F. (65° C.). The outlet temperatures of the two streams need not be identical; in most applications, they will in fact be different. Generally, it is preferred that the salinous water have a longer effective residence time within the solar pond and thus attain a higher temperature than the air stream.

In order to increase the efficiency of the solar pond, evaporative heat loss therefrom is inhibited through the use of a covering. Suitable coverings are those which are transparent to solar radiation, while simultaneously being opaque to long wave radiation. Obviously, since the technique employed herein requires a flowing air stream, a covering is necessary to provide an enclosed system. Additionally, a suitable covering will provide an insulating effect between the air stream and water being heated, and the atmosphere, such that conductive and convective heat loss is minimized. A relatively thin (four to about six mils) sheet of polyvinyl chloride can be suitably employed, as can two such sheets which are uniformly tacked to provide a multitude of dead air bubbles having a minimum air gap of about one inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fused polyvinyl chloride bubbles, about one to two inches thick; and, a combination of polyvinyl chloride-coated fiberglass to which the polyvinyl sheet is uniformly tacked. The distance between the covering and the surface of the water is preferably from 5 to 950 centimeters.

Also of importance, with respect to the efficiency of the solar pond, is the insulation of the sides and bottom thereof. Several techniques to accomplish this will become evident to those possessing the requisite skill in the appropriate art. For instance, the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styrofoam, vermiculite, etc., can be used as the lining over which the black sheet of polymeric material is placed. Insulating material can be foamed on and thus become integral with the polymeric sheet, or the polymeric material can be impregnated with an inorganic substance having a high absorptivity/emissivity ratio; this may be copper oxide, nickel oxide, black nickel, etc.

The covered and well-insulated solar pond may be designed and constructed in any suitable manner which fosters evaporation of non-salinous water vapor from the salinous water at the bottom of the pond, and saturation therewith of the heated air stream flowing over the salinous water. As used herein, the term "saturation" is not necessarily intended to connote 100% saturated air. Rather, it refers to a more practically obtained level of about 95%, or more of the possible water content of the air at its then-existing temperature. As a practical matter, the higher the temperature attained by both streams, the greater will be the quantity of potable water produced per pound of circulated air. Likewise, the quantity of generated power, where produced, increases, as does the effective degree to which insolation and the absorbed radiant solar energy are utilized.

One particularly suitable solar pond is partially illustrated (in elevation) in the accompanying drawing; as shown, the flowing air stream is introduced into an area above that into which the salinous water is charged. The two discrete areas are divided, but remain in open communication by means of separated, black-bodied baffles having alternating downwardly-angled and upwardly-angled edges. These baffles provide a serpentine-like path for at least a portion of the flowing air stream. In another design, the solar pond is divided into two chambers by an imperforate, black-bodied solar heat collector and the upper chamber is thereby sealed as a dead-air space; both the air stream and salinous water are introduced into the lower chamber. The solid heat collector may be provided with perpendicular heat pipes extending therethrough from the upper sealed chamber into the lower chamber; the heat pipes may extend into the lower chamber to the extent that they come into direct contact with the salinous water. Other suitable solar pond designs may be employed in the present process, none of which forms an essential feature of the invention.

As previously stated, an important variable constitutes the temperature to which the air stream and salinous water are heated within the solar radiation heat sink. Also of major importance is the temperature of the salinous water originally obtained from the source and charged into the solar radiation heat sink. Regardless of the temperature of the latter, judicious operation dictates the utilization of virtually all the resulting temperature differential. To illustrate, where an acceptable salinous water thermal gradient does not exist, or is impractical to obtain, the surface salinous water is introduced into the solar pond. Where such is available at say 80° F. (26.7° C.), and becomes heated to about 135° F. (56.8° C.) in the solar pond, recoverable energy is lost and/or wasted if salinous water is returned to the source at a temperature more than about 15° F. (8.4° C.) higher than 80° F. (26.7° C.). Similarly, where ocean surface water is available at about 85° F. (29.4° C.), and colder, deeper sea water is obtainable at about 70° F. (21.1° C.), salinous water is preferably returned to the source at a temperature not more than about 15° F. (8.4° C.) higher than 70° F. (21.1° C.). In short, the radiant energy absorbed in the solar pond should be utilized to the greatest possible extent. The process encompassed by the present invention makes such utilization technically and economically possible.

Following the prescribed period of exposure to absorbed radiant solar energy, during which time the temperature of the flowing air stream and that of the salinous water have been increased to a level within the range of about 130° F. (54° C.) to about 210° F. (99° C.), the water-saturated air stream is introduced into a vessel which functions as a cooler/condenser. The condensate is recovered from a vapor/liquid separator as potable water, and the air stream is recycled to the solar pond. Where only the recovery of potable water is intended, the vessel into which the heated, saturated air stream is introduced may be an air-cooled (ambient air) condenser, a condenser cooled by the evaporation of water, or one which utilizes salinous water via indirect heat-exchange. In either event, the coolant need not be "cold" since it is preferred that the air stream recycled to the solar pond be at a temperature above about 100° F. (37.8° C.), and preferably at least about 120° F. (49° C.). The water content of saturated air is exponential with increased temperature, and cold air cannot accept large amounts of water. Therefore, the more environmentally acceptable ambient air cooling is not only practical, but acceptable. Recirculation of hot air also affords more efficient utilization of the heat sink surface area in view of the fact that any portion not being used to heat cold air is functioning at maximum capacity for evaporation of water. Elevated air inlet temperatures also provide for subatmospheric flashing of the condensate, the resulting vaporous phase being passed through a turbine, from the resulting motion of which energy may be recovered.

The heated, saturated air stream emanating from the solar pond may also be introduced into an evaporator wherein it vaporizes a hydrocarbon by way of indirect contact therewith. Of course, the air stream is cooled as a result, and the released condensate may be removed directly in the aforementioned vapor/liquid separator. The vaporized hydrocarbon is introduced into a turbine, from the resulting motion of which energy is recovered. This energy may, of course, be employed to drive a generator for resulting power generation. However, since air circulation throughout the overall process contributes a large share of the utilities cost, a preferred technique involves driving an air compressor with the energy produced via the turbine motion. The recovered energy may also be used for water circulation. Hydrocarbon vapors exiting from the turbine are cooled and/or condensed, and re-introduced into the vaporizer.

Preferred classes of hydrocarbons, for use in the vaporization cycle, are paraffins and mono-olefins containing from about one to about four carbon atoms per molecule, and include, therefore, methane, ethane, ethylene, propane, propylene, butane and butylene (including its isomers), as well as mixtures thereof. Especially preferred are propane, propylene, butanes and/or butylenes. Halogenated hydrocarbons, containing fluorine and/or chlorine, most of which are categorized under the generic name "Freon" (a trademark for a line of fluorinated hydrocarbons) may also be employed in the hydrocarbon system, or vaporization cycle. Exemplary of these halogenated hydrocarbons are trichloromonofluoromethane, dichlorodifluoromethane, monochlorotrifluoromethane, monobromotrifluoromethane, tetrafluoromethane, monochlorodifluoromethane, trichlorotrifluoroethane, dichlorotetrafluoroethane, octafluorocyclobutane, tetrachlorodifluoroethane, etc.

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances is well within the purview of one skilled in the appropriate art, and the use thereof to modify the illustrated process will not create a departure from the scope and the spirit of the appended claims.

DESCRIPTION OF DRAWING

With specific reference now to the drawing, the sole FIGURE represents particularly preferred embodiments of the potable water recovery process which is encompassed by the inventive concept herein described. Further description, in conjunction with the drawing, will be founded upon the availability of surface sea water at a temperature of about 85° F. (29.4° C.) and colder, deeper sea water at about 70° F. (21.1° C.). It is assumed air introduced into the solar radiation heat sink will be 100% saturated at a temperature of 125° F. (51.8° C.). The solar pond is assumed to accommodate about 1,000 lb/hr. (454.5 kg/hr.) of saturated inlet air (on a dry basis), and is operated and sized such that the exit air is 80% to 90% saturated at a temperature of about 200° F. (93.3° C.). No attempt has been made to adjust the quoted energy outputs for such factors as turbine inefficiency or internal energy requirements of operating the process.

As a general principle, the salinous water emanating from the solar pond should be at a temperature at least equal to, and preferably higher than that temperature at which 100% saturated air would have the same water content (lb/lb. of dry air) as the exit air has at its temperature and degree of saturation. Thus, in one illustrative example, where 200° F. (93.3° C.) air is 80% saturated and contains about 1.84 lb. water/lb. dry air, 100% saturated air at this water content would have a temperature of about 197.5° F. (91.9° C.), which is the minimum temperature to which the salinous water should be heated.

ILLUSTRATIVE EXAMPLE I

As previously stated, the existence of an ocean thermal gradient, although advantageous, is not essential to the present invention; this illustration is presented to show a basic simplified technique not dependent upon such a temperature differential, and in which there is no necessity for power generation. Salinous water, from a 70° F. (21.1° C.) source thereof, is introduced via line 1, at a rate of about 4163 lb/hr. (1892 kg/hr.) and admixed with a 190° F. (88° C.) recycle stream from line 23, in the amount of about 1692 lb/hr. (769 kg/hr.). The fresh salinous water has a salinity of about 5.3% by weight while the recycle stream is about 10.1% saline; the mixture contains 392 lb/hr. (178.2 kg/hr.) of salinous materials such as the sulfates and chlorides of sodium, potassium, calcium and magnesium, etc., and continues through line 1 into solar pond 2 at a salinity of 6.7% and a temperature of 107° F. (41.7° C.). Also introduced into solar pond 2, via line 3, is a 100% saturated air stream containing 0.095 lb. water/lb. dry air at a temperature of 125° F. (51.8° C.) at the rate of 1095 lb/hr. (498 kg/hr.). Solar pond 2 is provided with a covering 4, of the type hereinbefore described, and is divided into upper and lower chambers 5 and 6 by a separated series of black-bodied baffles 7 having alternating downwardly-angled and upwardly-angled edges. These provide a serpentine-like flow of at least a portion of the air stream through chambers 5 and 6 to facilitate evaporated non-salinous water pick-up. Solar pond 2 is sized and operated such that (i) 50% by weight of water (salt free basis) is evaporated from the salinous water and, (ii) the exit air stream in line 8 is saturated at a temperature of 200° F. (93° C.) and contains 2.066 lb. water/lb. of dry air; the salinous water exiting the solar pond via line 18 is at a temperature of 198° F. (92.4° C.).

In this illustration, the salinous water in line 18, in the amount of 3884 lb/hr. (1765.5 kg/hr.) contains 392 lb/hr. (178.2 kg/hr.) of salinous material — a salinity of 10.1% by weight. After diverting 1692 lb/hr. (769 kg/hr.) through line 23 as recycle, the remaining 2192 lb/hr. (996.4 kg/hr.) continue through line 18, to be returned therethrough to the original source thereof. The 90% saturated air stream in line 8, in the amount of 2971 lb/hr. (1350.5 kg/hr.), is cooled to 125° F. (51.8° C.), and introduced into separator 20. Potable water is recovered by way of lines 21 and 22, in the amount of about 1971 lb/hr. (895.9 kg/hr.), or about 2375 gal. (8989 liters) during a ten-hour daylight period. The air stream, at 100% saturation, in the amount of 1095 lb/hr. (498 kg/hr.) is introduced via line 3 into upper chamber 5 of solar pond 2 at a temperature of 125° F. (51.7° C.).

ILLUSTRATIVE EXAMPLE II

In the previous discussion of the prior art, it was shown that salinous sea water should not be returned to the source at a temperature more than 15° F. (8.4° C.) higher than the coldest available salinous water. This illustration is intended to show the added benefits of flashing the salinous water emanating from the solar pond, and will presuppose the availability of a reasonable ocean thermal gradient. Furthermore, the hot air stream, containing evaporated non-salinous water, emanating from the solar pond will be used to vaporize a hydrocarbon. The resulting hydrocarbon vapors will pass into and through a turbine, from the resulting motion of which energy is recovered. Surface sea water, at a temperature of about 85° F. (29.4° C.), is removed from the source via line 1, in the amount of about 5252 lb/hr. (2387 kg/hr.), of which 278 lb/hr. (126.4 kg/hr.) is salt of the types previously set forth. The salinous sea water is admixed with 2,000 lb/hr. (909.1 kg/hr.) of a recycle stream from line 23; this stream has a salinity of about 7.92% by weight and a temperature of about 198° F. (92.4° C.). The resulting mixture, at a temperature of about 116° F. (46.9° C.) and containing about 436 lb/hr. (198.2 kg/hr.), continues through line 1 into lower chamber 6 of solar pond 2. An air stream which is 100% saturated at a temperature of 125° F. (51.8° C.), and containing 0.095 lb. water/lb. dry air, is introduced via line 3 into the upper chamber 5 of solar pond 2, in the amount of 1095 lb/hr. (497.7 kg/hr.).

Solar pond 2 is sized and operated, in accordance with the available insolation over a 10-hour daylight period, to effect 35% by weight evaporation of the water contained in the salinous water, and to produce an exiting air stream which is 80% saturated at a temperature of 200° F. (93° C.), or 1.836 lb. water/lb. dry air, while the exiting salinous water is at a temperature of about 198° F. (92.4° C.). The heated air stream, in an amount of 2741 lb/hr. (1246 kg/hr.), of which 1836 lb/hr. (834.5 kg/hr.) is water, emanates through line 8 and is passed thereby into hydrocarbon evaporator 9. Isobutane, at a temperature of about 75° F. (23.9° C.) and in the amount of 12,120 lb/hr. (5509 kg/hr.) is introduced via line 10; isobutane vapors, at a temperature of 120° F. (49° C.) and a pressure of 95 psia. (6.47 atm.), are withdrawn via line 11 and introduced thereby into turbine 12. Exiting hydrocarbon vapors pass through line 13 into cooler/condenser 14 wherein the temperature is decreased to about 75° F. (23.9° C.) via indirect contact with 70° F. (21.1° C.) sea water passed through line 16 from line 34. The warmed sea water is returned to the source by way of lines 17 and 18, while the isobutane is recycled to vaporizer 9 via line 10. The downstream turbine pressure and that on the shell side of cooler/condenser 14 is about 0.43 psia. (22.2 mm. of Hg.), and 151,200 BTU/hr. of energy is recovered. This recovered energy may be used to drive a compressor or pump 15; or, where item 15 is a generator, generate 442.8 kilowatts of power over the 10-hour period. The 125° F. (51.8° C.) air stream from hydrocarbon evaporator 9 is passed through line 19 into separator 20; 1,095 lb/hr. (497.8 kg/hr.) of 100% saturated air is recovered via line 3 and introduced thereby into solar pond 2. The 1,741 lb/hr. (791.4 kg/hr.) of potable water is recovered from separator 20 by way of conduits 21 and 22.

Salinous water in the amount of approximately 5,511 lb/hr. (2,505 kg/hr.), at a temperature of about 198° F. (92.2° C.), having a salinity of 7.92%, is withdrawn from solar pond 2 through line 18. About 2,000 lb/hr. (909 kg/hr.) are diverted through line 23 and admixed with the sea water in line 1 to raise the temperature thereof from 85° F. (29.4° C.) to 116° F. (46.3° C.). Rather than permit the remaining 3,511 lb/hr. (1,596 kg/hr.) of salinous water to continue through line 14 for discharge thereby into the source at a temperature of 198° F. (92.2° C.), the stream is diverted through line 24 into vacuum flash zone 25 which is maintained at a subatmospheric pressure of about 1.69 psia. (87.4 mm. of Hg.). The remaining salinous liquid phase, in the amount of 3,265 lb/hr. and at a temperature of 120° F.

(49° C.) is withdrawn through line 27, while the 246 lb/hr. (111.8 kg/hr.) of vapors pass via line 26 into and through turbine 28. The latter has a downstream pressure of about 0.43 psia. (22.2 mm. of Hg.), and will generate approximately 20,172 BTU/hr.; when the resulting motion is used to drive generator 29, an additional 59.1 kilowatts of power (over the 10-hour period) is produced. The vapors pass through line 30 and are introduced thereby into cooler/condenser 31, and an additional 246 lb/hr. (111.8 kg/hr.) of potable water are recovered through line 22. The heat-exchange medium used in cooler/condenser 31 is salinous water in line 32; the warmed water is returned to the source by way of lines 33 and 18. If the 120° F. (49° C.) liqid phase from the first flash zone in line 27 is flashed again to 75° F. (23.9° C.), which is 5° F. (2.8° C.) higher than the colder, deeper sea water temperature, an additional 128 lb/hr. (58.2 kg/hr.) of potable water is recovered.

With respect to cooler/condensers 14 and 31, where the ocean thermal gradient is not readily available and obtained, the heat-exchange medium will be a portion of the surface sea water diverted from line 1 through conduits 16 and 32, respectively. Where, however, an ocean thermal gradient is available, the colder, deeper water will be withdrawn from the source via line 34. A portion will be diverted through line 35 for introduction thereby into cooler/condenser 31 via line 32, the remainder continuing through line 34 and line 16 into cooler/condenser 14.

Total potable water recovery from the above-described process using both flashing operations is 2,115 lb/hr. (961.4 kg/hr.), or 2,548 gal. (9,645 liters) over the 10-hour daylight period. Power can be generated in the total amount of about 502 kilowatts. These values are based upon 1,000 lb/hr. (454.5 kg/hr.) of dry air which translates to a fresh salinous water charge rate of 5,252 lb/hr. (2,387 kg/hr.). For a larger, commercially-scaled process, having a salinous water charge rate of 3.5 MM lb/hr. (1.6 MM kg/hr.), generated power would amount to about 33,450 kilowatts and potable water would be recovered in the amount of 1.70 MM gal. (6.43 MM liters).

In one variation of the process as above described, a pressure recorder controller and valve is installed in line 11, and a temperature-indicating recorder in line 8. The latter produces an output signal representative of the temperature of the water-containing hot air stream from the solar pond 2, and transmits this signal to the pressure recorder controller, the set point of which is adjusted responsive thereto and the pressure on the shell side of evaporator 9 is regulated accordingly. Thus, as the air temperature increases, assuming constant air flow rates through solar pond 2, the evaporator pressure is increased. The thermal efficiency of energy recovery increases, assuming cooler/condenser 14 is maintained at constant temperature. Conversely, as the amount of insolation decreases, and thus the absorbed solar energy, the pressure in evaporator 9 is decreased, and thus dictates a lower boiling point. The evaporator, therefore, more readily removes heat from the saturated air and the rate of water condensation is increased. While simultaneously minimizing cooling/condensing duties, this will increase low-temperature water collection. In another variation, the salinous water may be maintained within the solar pond for a longer period in order to effect a higher percentage of evaporation therefrom — i.e. up to about 90% by weight. In still another variation, the salinous water, following the 10-hour daylight period, may be subjected to one or more vacuum flash separations for the purpose of producing additional power and recovering additional potable water.

The foregoing description of the process encompassed by the present invention, particularly when viewed in conjunction with the description of the accompanying drawing, is believed to present a clear understanding thereof as well as the advantage afforded through its utilization.

I claim as my invention:

1. A process for recovering potable water from a source of salinous water which comprises the sequential steps of:
    (a) introducing a portion of salinous water from said source into a solar radiation heat sink;
    (b) introducing an air stream into said solar radiation heat sink and flowing said air stream over said salinous water to produce a water containing air stream;
    (c) exposing said salinous water and said air stream, within said solar radiation heat sink, to absorbed solar energy for a time sufficient to increase (i) the temperature of said salinous water and, (ii) the temperature and water content of said flowing air stream;
    (d) withdrawing the thus-heated (i) water-containing air stream and, (ii) salinous water from said solar radiation heat sink;
    (e) reducing the temperature of said water-containing air stream via indirect contact with a vaporizable hydrocarbon or halohydrocarbon, wherein the resultant vaporizable hydrocarbon or halohydrocarbon is introduced into and through a turbine from which motion energy is produced, said reduction in temperature of said water-containing air stream resulting in separating and recovering potable, non-salinous water from said water-containing air stream; and
    (f) recycling the resulting cooled air stream to said solar radiation heat sink.

2. The process of claim 1 further characterized in that at least a portion of the heated salinous water withdrawn from said heat sink is recycled thereto.

3. The process of claim 1 further characterized in that said air stream is introduced into said solar radiation heat sink at a temperature above about 120° F.

4. The process of claim 1 further characterized in that (i) said air stream and, (ii) said salinous water are withdrawn from said solar radiation heat sink at a temperature in the range of about 130° F. to about 210° F.

5. The process of claim 4 further characterized in that said air stream and said salinous water portion are withdrawn from said solar radiation heat sink at a temperature above about 150° F.

6. The process of claim 1 further characterized in that said salinous water is withdrawn from said solar radiation heat sink at a temperature higher than that of said air stream.

7. The process of claim 1 further characterized in that (i) at least a portion of said heated salinous water is introduced into a flash separation zone, maintained at subatmospheric pressure, to provide a non-salinous vaporous phase and a salinous liquid phase, and, (ii) said vaporous phase is introduced into and through a turbine, from the resulting motion of which power is generated.

8. The process of claim 7 further characterized in that the exit vapors from said turbine are indirectly contacted with a second salinous water portion from said source to recover additional potable water.

9. The process of claim 8 further characterized in that said second salinous water portion and the salinous water portion introduced into said solar radiation heat sink are obtained from said source at substantially the same temperature.

10. The process of claim 8 further characterized in that the temperature of said second salinous water portion is at least 5° F. to about 15° F. lower than that of the salinous water portion introduced into said solar radiation heat sink.

* * * * *